(12) United States Patent
Park (10) Patent No.: US 7,845,044 B2
(45) Date of Patent: Dec. 7, 2010

(54) VEHICULAR WIPER FRAME

(76) Inventor: Se-Heon Park, Saetbyeolmaeul, Bundang-dong 39, Bundang-gu, Seongnam-si, Gyeonggi-do (KR) 406-203

( * ) Notice: Subject to any disclaimer, the term of this patent is extended or adjusted under 35 U.S.C. 154(b) by 884 days.

(21) Appl. No.: 11/417,140

(22) Filed: May 4, 2006

(65) Prior Publication Data

US 2007/0044266 A1 Mar. 1, 2007

(30) Foreign Application Priority Data

Aug. 26, 2005 (KR) .................. 10-2005-0078603
Aug. 26, 2005 (KR) .................. 10-2005-0078604

(51) Int. Cl.
*B60S 1/38* (2006.01)
(52) U.S. Cl. ............ 15/250.43; 15/250.48; 15/250.201; 15/250.361
(58) Field of Classification Search .............. 15/250.48, 15/250.451–250.454, 250.361, 250.44, 250.43, 15/250.201, 250.32
See application file for complete search history.

(56) References Cited

U.S. PATENT DOCUMENTS 2,697,241 A * 12/1954 Oishei ................... 15/250.452
3,418,679 A * 12/1968 Barth et al. ............. 15/250.201
3,899,800 A * 8/1975 Wittwer et al. ........... 15/250.44

FOREIGN PATENT DOCUMENTS

DE 19854372 * 5/2000

* cited by examiner

*Primary Examiner*—Gary K Graham
(74) *Attorney, Agent, or Firm*—Lowe Hauptman Ham & Berner LLP (57) ABSTRACT

A vehicular wiper frame and a rubber blade that mounts to the frame are provided. The frame allows the rubber blade to exert vertical pressure against a windshield for a secure contact between the two surfaces. The frame includes a slot in which a mounting portion of the rubber blade is mounted, creates a predetermined offset between the centers of the mounting portion and a wiping portion of the rubber blade therebelow, and is formed in a position so that the pressure of the wiper arm can fall at the center of the wiping portion. The mounting portion is slanted and installed at a predetermined angle to the frame, and the wiping portion extends from the mounting portion and includes a contact surface contacting the windshield surface. The pressing force of the wiper arm 80 passes through the central point of the wiping portion.

5 Claims, 10 Drawing Sheets

FIG. 1

PRIOR ART

FIG. 2

PRIOR ART

FIG. 3

PRIOR ART

FIG. 4

PRIOR ART

FIG. 5

PRIOR ART

FIG. 6A

PRIOR ART

FIG. 6B

PRIOR ART

VEHICULAR WIPER FRAME

BACKGROUND OF THE INVENTION

1. Field of the Invention

The present invention relates to a vehicular wiper frame and a rubber blade mounted thereon, and more particularly, to a frame that can allow a rubber blade lying against a vehicular windshield to exert vertical pressure against the windshield. By maintaining the pressure against the windshield in a substantially vertical direction, the moment of a force generated between the wiping surface of the rubber blade and the surface of the windshield is minimized and a secure contact between the two surfaces is maintained.

2. Description of the Related Art

An automotive wiper is operated by a wiper motor through a mechanical linkage that moves the wiper arm back and forth in a predetermined arc. Disposed on the end of the wiper arm is a detachably mounted wiper frame to which a wiper blade made of rubber is attached.

Conventional wipers attached to wiper arms include a skeletal frame and a blade portion mounted on the frame and contacting a windshield to wipe it in a pendular movement.

Figure 1:
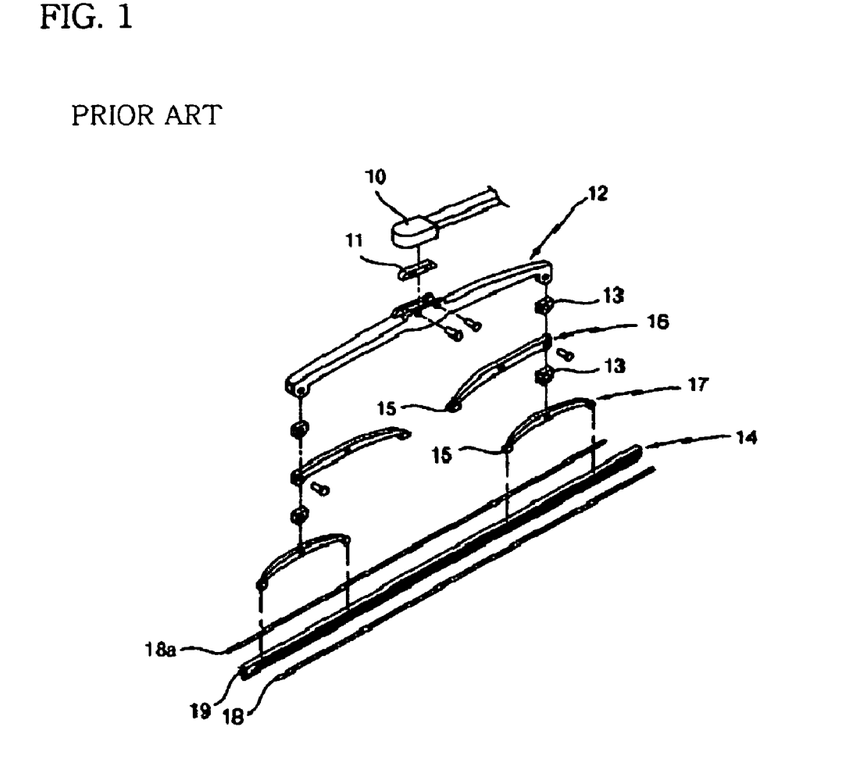
FIG. 1 is an exploded perspective view of a vehicular wiper structure according to the related art.
Figure 2:
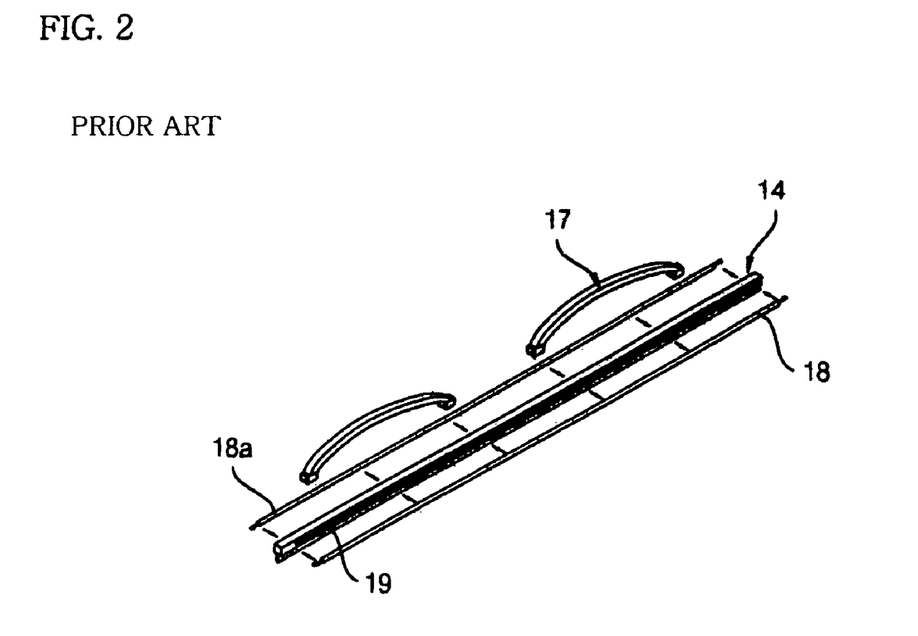
FIG. 2 is an exploded perspective view of the assembling structure of spring rails on a wiper blade according to the related art.

Referring to FIG. 1, a conventional wiper 10 includes: a main frame 12 having an adapter 11 thereon for mounting the wiper arm 10; a first frame 16 symmetrically mounted on rivet joints 13 at either end of the main frame 12, and having a blade bracket 15 for evenly distributing load on the blade 14 and holding the blade 14 inserted therein; a second frame 17 symmetrically mounted on rivet joints 13 at either end of the first frame 16, and having blade brackets 15 on either end thereof for evenly distributing load on the blade 14 and holding the blade 14 inserted therein; a blade 14 having a rail portion 19 formed thereon along in which resilient tension springs 18 and 18a having a predetermined elasticity are inserted, the resilient tension springs applying a predetermined load furnished by the first and second frames 16 and 17 along the length of the blade 14 so that the blade 14 presses evenly against a windshield when wiping it; and a metallic tension spring 18 and 18a inserted along the length on either side of the blade 14 to support the load furnished by the first and second frames 16 and 17.

Here, in order for the main frame 12 to transmit the movement of the wiper arm 10 to an arcuate movement of the blade 14, the wiper arm 10, blade 14, and the tension springs 18 and 18a that provide resilience to the blade 14 converge at one point so that they move in unison according to the movement of the wiper arm 10. Also, the first and second frames 16 and 17 evenly distribute load furnished by the main frame 12, and, along with the main frame 12, are press-formed to have holes formed therein to facilitate water drainage and reduce weight.

Figure 3:
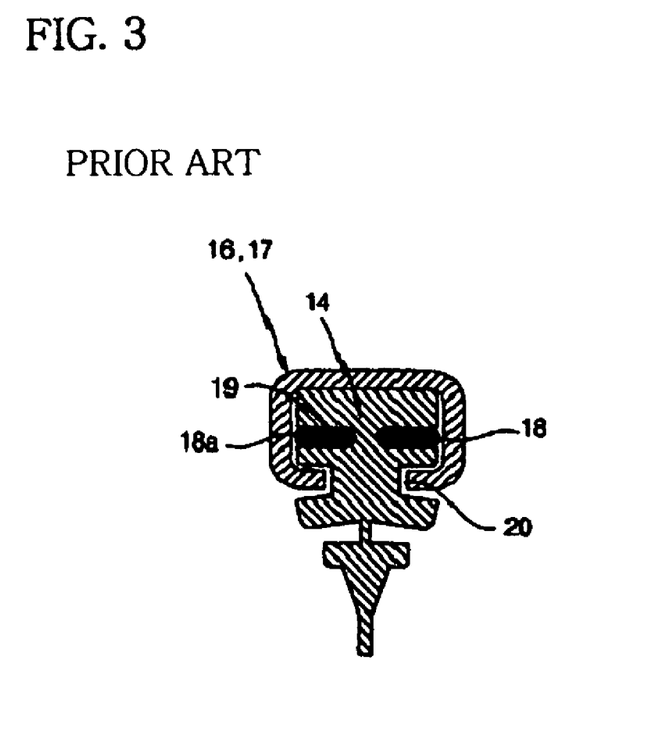
FIG. 3 is a sectional view of a blade assembled with spring rails according to the related art.

The blade has a groove 20 (see FIG. 3) running lengthwise therealong for guiding the blade brackets 15 of the first and second frames 16 and 17, and a separate rail portion 19 for accommodating the tension springs 18 and 18a that provide resilience to the blade 14.

In the structure of this type of wiper, because the load on the blade is applied at certain points on the blade, it is unevenly distributed along the length of the blade. This unevenness causes premature wear of blade areas that are more compressed, while less compressed areas are prone to streak or overshoot the windshield glass underneath.

Figure 4:
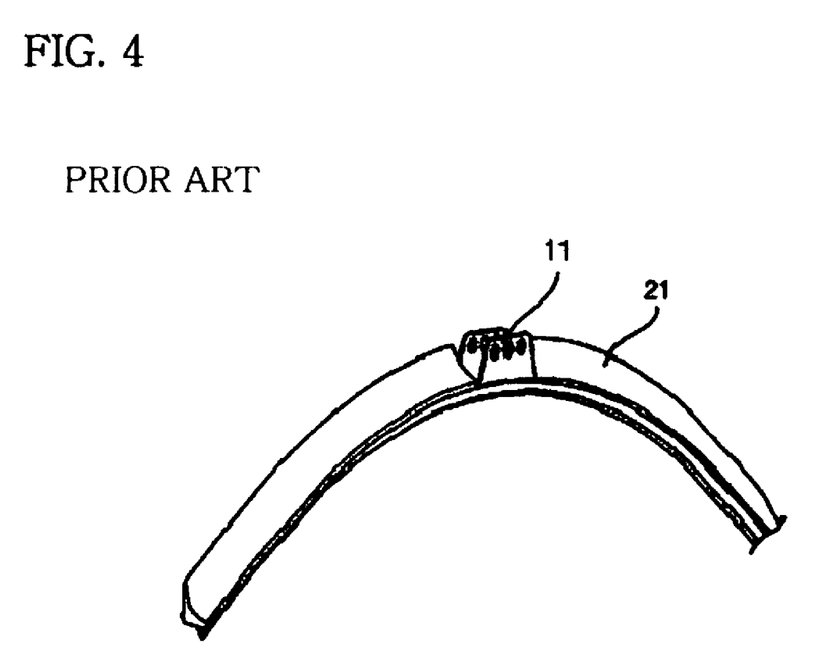
FIG. 4 is a perspective view of another type of wiper according to the related art.
Figure 5:
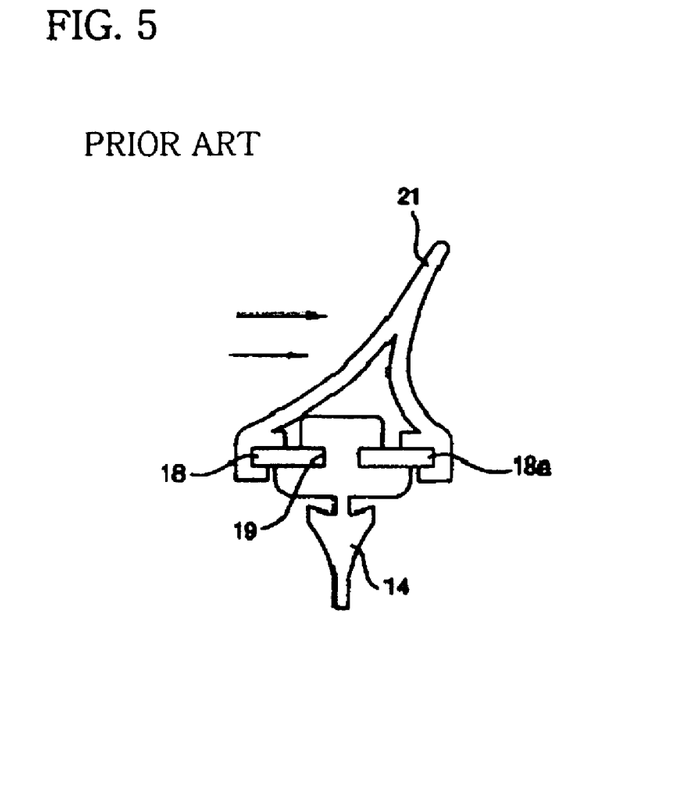
FIG. 5 is a sectional view of the wiper shown in FIG. 4.

The wiper shown in FIGS. 4 and 5 does not have a main frame supporting a metal frame separately from a blade, but has tension springs inserted in the blade 14, over which a rubber cover 21 covers the unit.

That is, the rail portion 19 is formed along the lengths on either side of the blade 14, tension springs 18 and 18a are inserted into each rail portion, and a rubber cover 21 that functions as a spoiler is then inserted over the unit to conceal the tension springs 18 and 18a.

The problem with the foresaid wiper is that the aggregate tension of the two tension springs 18 and 18a and the rubber cover 21 necessitate the wiper arm maintaining an increased load on the wiper for the wiper to be operationally effective, unduly stressing the mechanism. Also, this type of wiper is not interchangeable with existing wiper arms on vehicles that have a tension present for the previously mentioned multipoint-type wiper blade. Furthermore, because the wiper requires the rubber spoiler-cum-cover to complete the formation thereof, the latter item cannot be omitted.

Figure 6A:
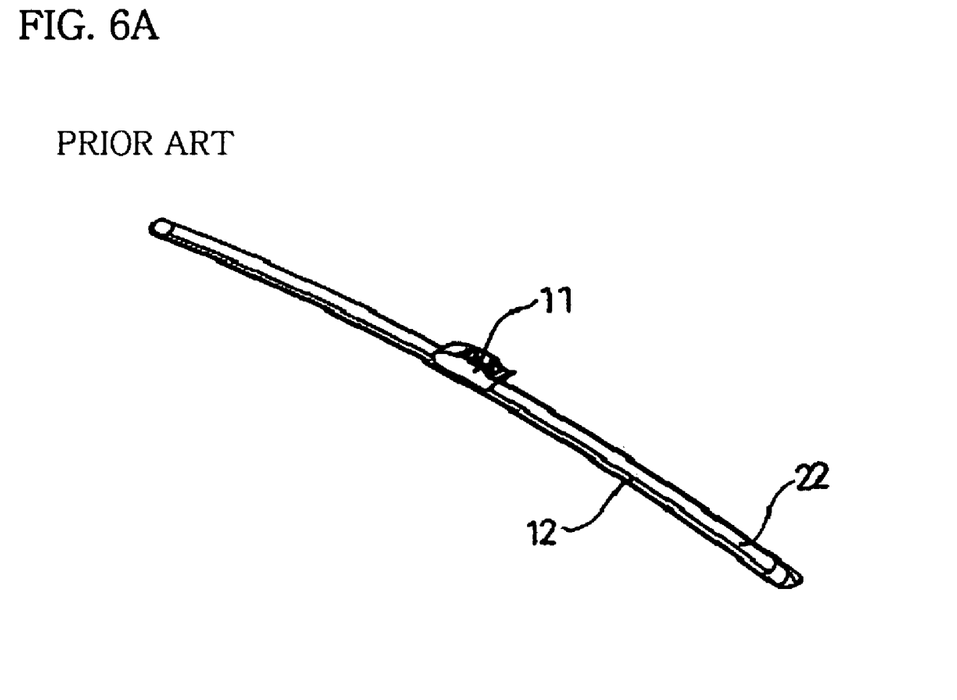
FIG. 6A is a perspective view and FIG. 6B is a side view thereof.
Figure 6B:
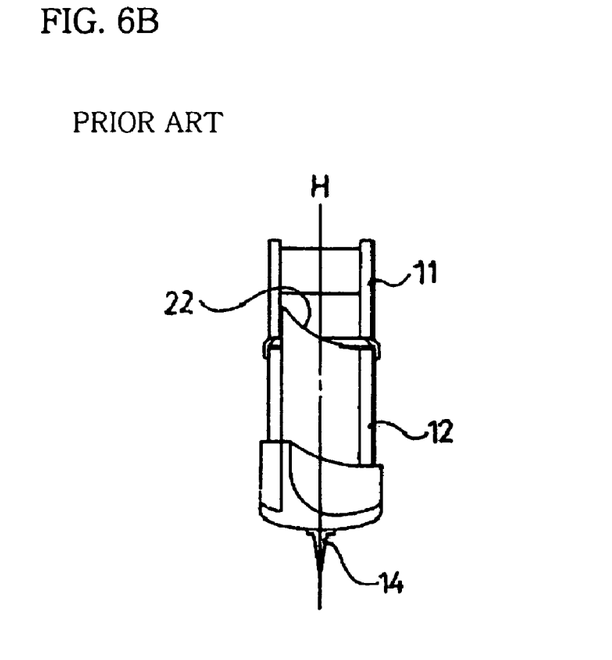

Another conventional type of wiper, shown in FIGS. 6a and 6b, is formed with a separate spoiler 22 fitted at the top of the rubber blade that the tension springs are inserted into. This type of blade prevents vibration, while maintaining a secure and even contact with a windshield.

However, because this wiper structure has an adapter 11 and frame 12 disposed in a vertical axis (H) direction of the adapter 11, the frame 12 and the tension spring by themselves cannot function as a spoiler. Therefore a separately formed spoiler is required, complicating the overall structure, and creating the possibility of vibration or judder caused by the spoiler and wind noise when pressed against a windshield.

In another conventional type of wiper shown in FIG. 7, the upper portion of the rubber blade 50 has a head portion 52 defining a mounting slot 51 for mounting the blade to a frame 60. The mounting slot 51 of the head portion 52 is inclined at an offset angle $\theta 1$ according to the disposition of a frame 60, such that a normal line of a cross section of the mounting slot 51 is offset by a predetermined angle from a vertical axis of the rubber blade 50. The lower portion of the rubber blade 50 that contacts a windshield is a wiping portion 53, which is formed perpendicularly on the vertical axis.

Thus, even without a spoiler, lifting of the wiper blade can be prevented at high speeds.

However, although the rubber blade is structurally prevented from lifting without a separately installed spoiler, the blade is not disposed vertically on the glass, so that its clearing capability diminishes.

That is, when the wiper operates and moves across the surface of the glass about the pivoting pressure center of the motor, the blade does not continuously contact the surface of the windshield at a perpendicular angle, thus failing to impart adequate contact between the blade and the windshield.

FIG. 8 is a typically shaped rubber blade 50a that is formed symmetrically around a center of a pressing force (fs), so that despite the position to which the wiper arm moves, the blade maintains a vertical contact with the surface of the windshield.

The rubber blade 50 with the anti-lift characteristic shown in FIG. 7 is asymmetrical to the left and right of the pressing force (fs) from the wiper arm so that the wiper blade cannot maintain a vertical disposition to the windshield throughout the movement range of the wiper arm. That is, the angle of the pressing force imparted on the rubber blade by the wiper arm cannot maintain a vertical disposition with respect to the surface of the glass, so that the wiper's contact, wiping ability, secure disposition, etc. are insufficiently maintained.

SUMMARY OF THE INVENTION

Accordingly, the present invention is directed to a vehicle wiper frame that substantially obviates one or more problems due to limitations and disadvantages of the related art.

An object of the present invention is to provide a wiper frame and rubber blade that are asymmetrically formed to both sides of a center of pressure applied by the wiper arm, while maintaining the wiper blade in substantially perpendicular contact with the surface of a windshield, without using a separate component.

Another object of the present invention is to provide a wiper frame and a rubber blade that can maintain a predetermined lean of the entire wiper to prevent judder and streaking and maintain reliable contact with a windshield.

A further object of the present invention is to provide a wiper frame and a rubber blade that maintain an even load distribution across the rubber blade on a windshield surface to increase wiping effectiveness and firm contact of the blade on the windshield, while preventing noise induced by judder and lift while the vehicle is in motion.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, there is provided a vehicular wiper frame that supports and presses a rubber blade on a vehicle's windshield surface, and is coupled through an adaptor to a wiper arm that presses and moves the rubber blade against and across the windshield surface. The wiper frame with a predetermined resilience has a slot that guides a sliding insert formed on the rubber blade to mount the rubber blade so that load thereon presses evenly across the windshield surface. The mounting portion at the upper end of the rubber blade is disposed at a predetermined angle against and mounted to the frame. The mounting portion supports a wiping portion having a contact surface forming the bottom end of the rubber blade. To allow the wiping portion of the rubber blade to apply vertical force on and contact the windshield surface by being mounted on the frame through the mounting portion, the slot, for mounting the rubber blade to create a predetermined offset between the centers of the mounting portion and the wiping portion of the rubber blade, is formed in a position so that the pressure of the wiper arm can fall at the center point of the wiping portion.

In another aspect of the present invention, there is provided a vehicular rubber blade that is mounted to a frame with a certain elasticity that evenly distributes load along the rubber blade onto the windshield surface. The frame is coupled through an adapter to a wiper arm and presses the rubber blade against the windshield surface to simultaneously move the rubber blade across the windshield surface. The rubber blade has a sliding insert into which the frame is installed. The top of the rubber blade is slanted and installed at a predetermined angle at a mounting portion with respect to the frame, and the lower end of the rubber blade has a wiping portion that extends from the mounting portion and includes a contact surface contacting the windshield surface. The mounting portion and wiping portion are formed so that their centers are offset from one another by a predetermined distance, so that the pressing force of the wiper arm passes through the central point of the wiping portion.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings:

FIG. 6 shows a further type of the wiper according to the related art, where

DETAILED DESCRIPTION OF THE INVENTION

Reference will now be made in detail to the preferred embodiments of the present invention, examples of which are illustrated in the drawings. Wherever possible, the same reference numbers will be used throughout the drawings to refer to the same or like parts.

Figure 9:
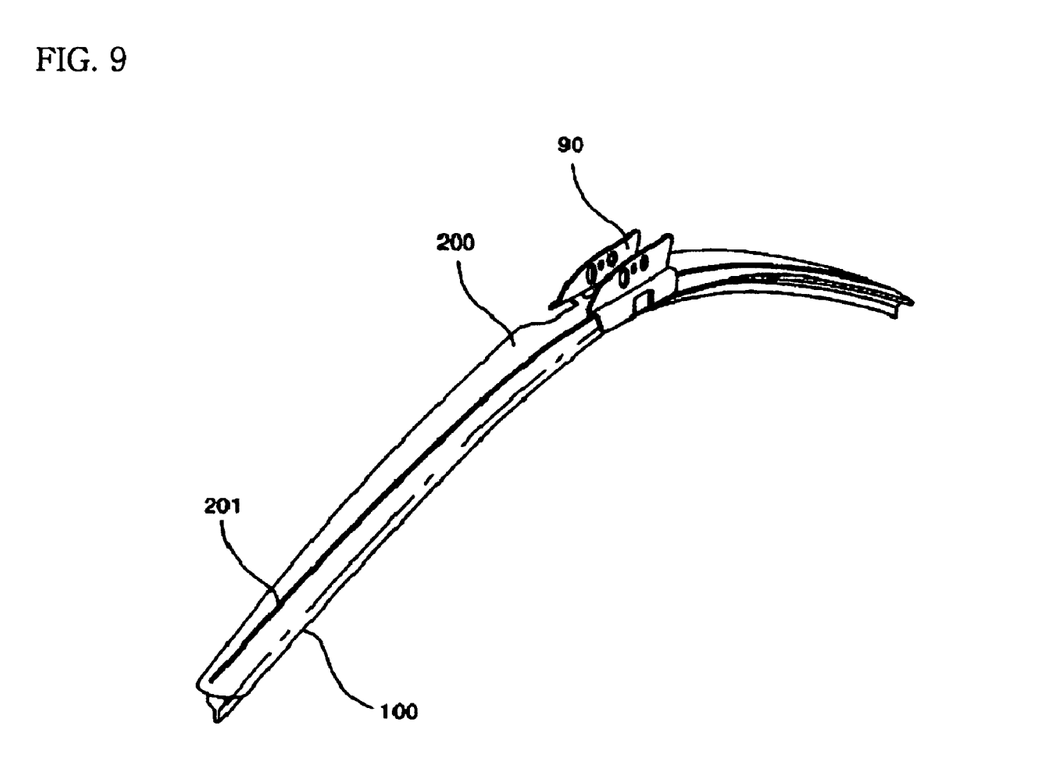
FIG. 9 is a perspective view showing an overall structure of a rubber blade mounted on a wiper frame according to the first embodiment of the present invention.
Figure 10:
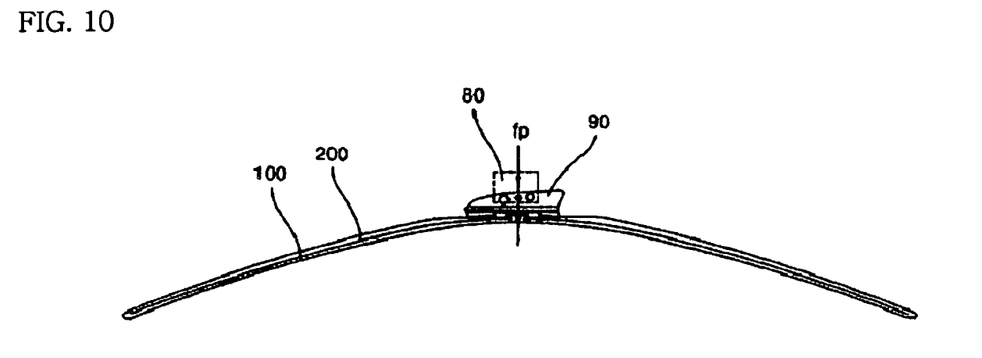
FIG. 10 is a plan view of the wiper according to the first embodiment of the present invention.
Figure 11:
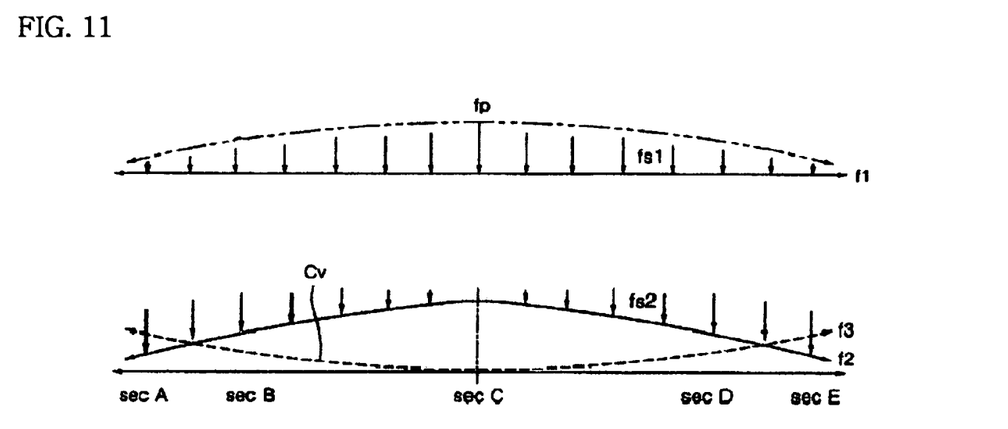
FIG. 11 is a graph showing the load distribution on the wiper frame in FIG. 10 and the response of the frame to the load.
Figure 12:
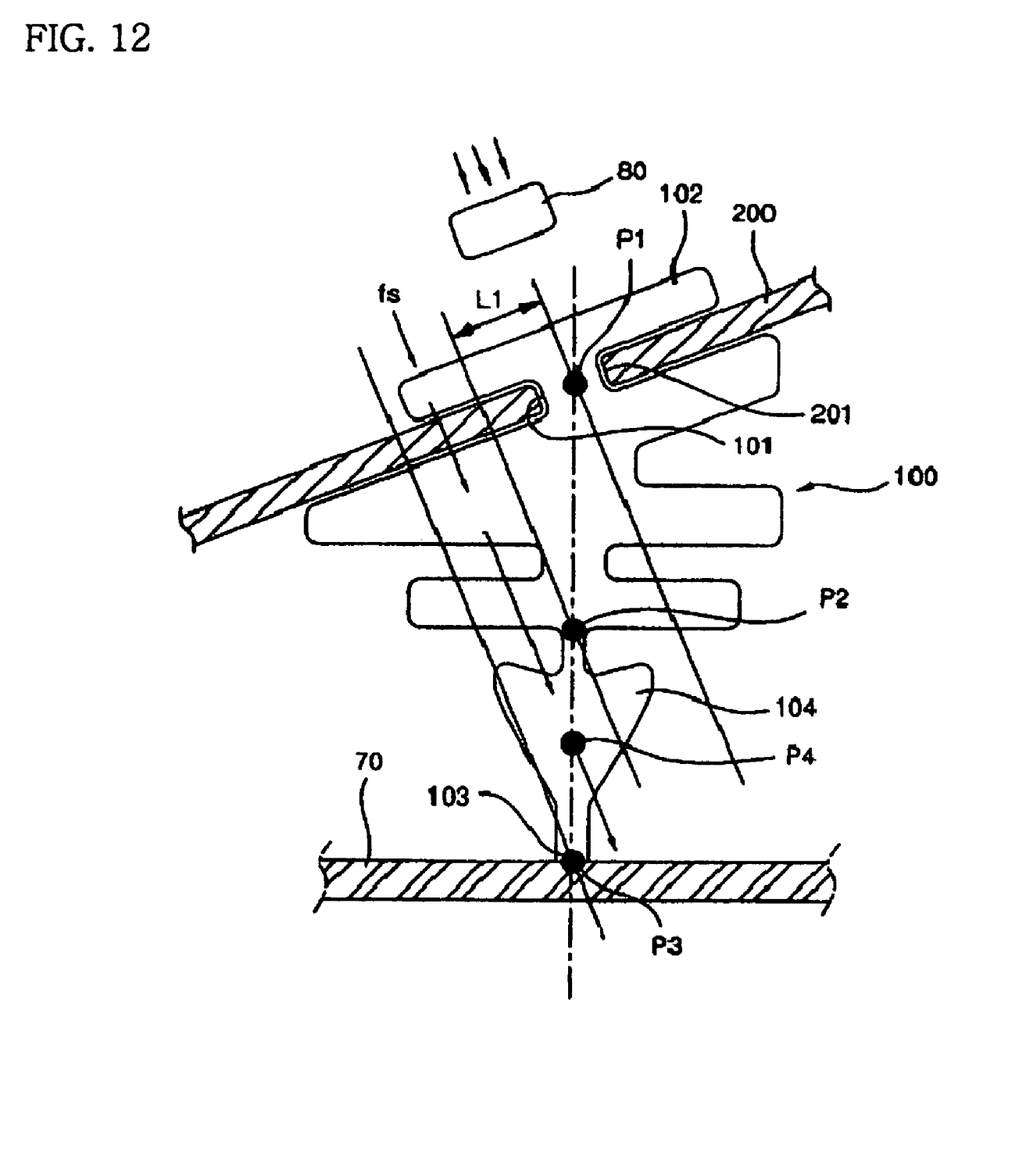
FIG. 12 is a sectional view showing an example of an installed rubber blade according to the first embodiment of the present invention.
Figure 13:
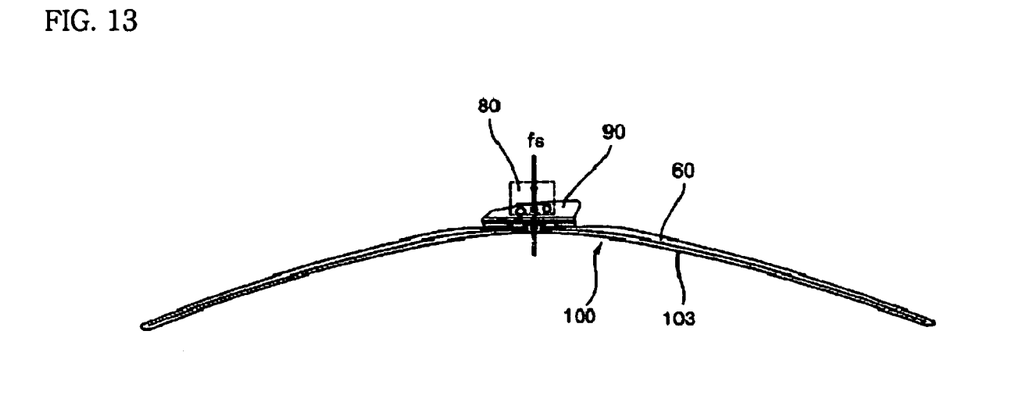
FIG. 13 is a plan view of a rubber blade installed on a wiper according to the second embodiment of the present invention.
Figure 14:
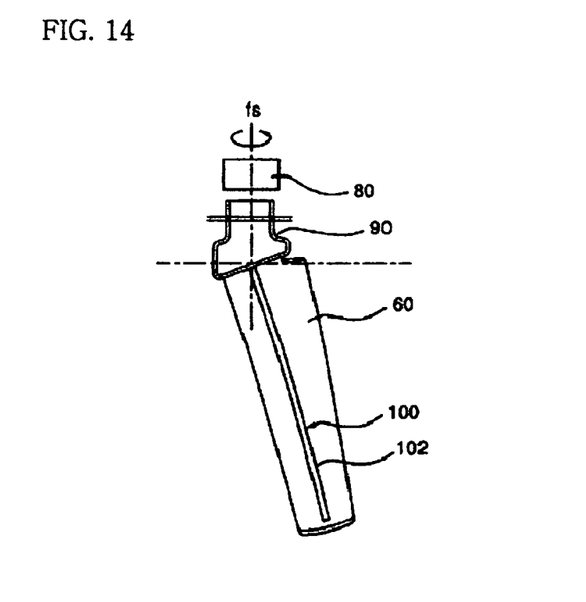
FIG. 14 is a side view of the wiper according to the second embodiment of the present invention.
Figure 15:
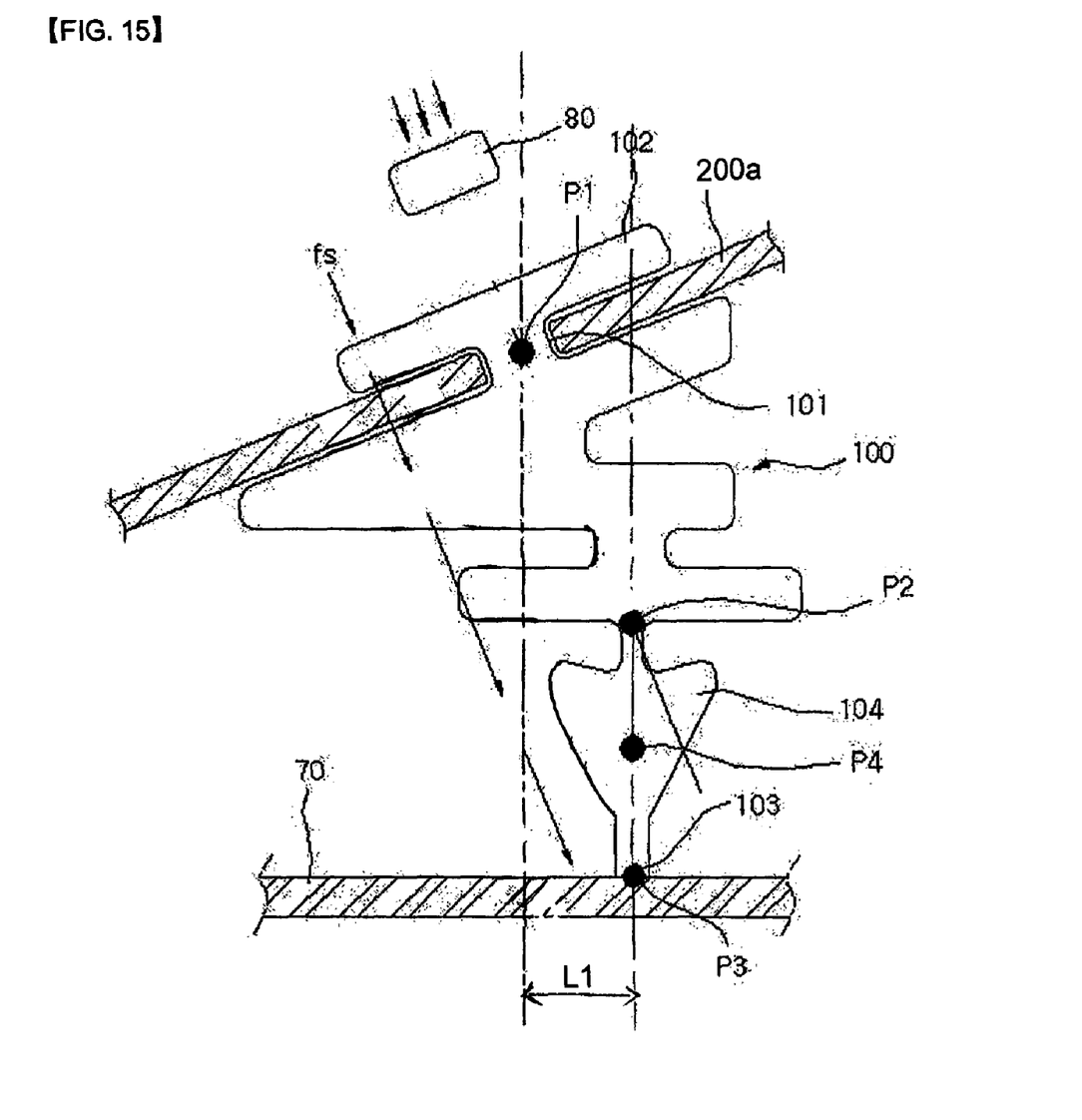
FIG. 15 is a sectional view showing the structure and shape of the rubber blade according to the second embodiment of the present invention.

FIG. 9 is a perspective view showing an overall structure of a rubber blade mounted on a wiper frame according to the first embodiment of the present invention. FIG. 10 is a plan view of the wiper according to the first embodiment of the present invention. FIG. 11 is a graph showing the load distribution on the wiper frame in FIG. 10 and the response of the frame to the load. FIG. 12 is a sectional view showing an example of an installed rubber blade according to the first embodiment of the present invention. FIG. 13 is a plan view of a rubber blade installed on a wiper according to the second embodiment of the present invention. FIG. 14 is a side view of the wiper according to the second embodiment of the present invention. FIG. 15 is a sectional view showing the structure and shape of the rubber blade according to the second embodiment of the present invention.

Hereinafter, the wiper frame according to the present invention will be described in the first embodiment, and the rubber blade of the wiper according to the present invention will be described in the second embodiment.

First Embodiment

Referring to FIGS. 9 through 12, a wiper frame 200 according to the first embodiment of the present invention supports and presses a rubber blade 100 on a vehicle's windshield surface 70, and is coupled through an adaptor 90 to a wiper arm 80 such that it presses and moves the rubber blade 100 against and across the windshield surface 70. The wiper frame 200 with a predetermined resilience has a slot 201 that guides a sliding insert 101 formed on the rubber blade 100 to mount the rubber blade 100 so that load thereon presses evenly across the windshield surface 70. The mounting portion 102 at the upper end of the rubber blade 100 is disposed at a predetermined angle and mounted to the frame 200. The mounting portion 102 supports a wiping portion 104 having a contact surface 103 defining the bottom end of the rubber blade 100.

To allow the wiping portion 104 of the rubber blade 100 to apply a vertical force on and contact the windshield surface 70 by being mounted on the frame 200 through the mounting portion 102, the slot 201 that mounts the rubber blade 100 to create a predetermined offset L1 between the centers of the mounting portion 102 and the wiping portion 104 of the rubber blade 100 is formed in a position so that the pressure fs1-fs2 of the wiper arm 80 can fall at the center point of the wiping portion 104.

The shape of the slot 201 formed in the frame 200 is symmetric about the center (fp) of the frame 200, as shown in FIG. 11.

Also, the shape of the slot 201 formed in the frame 200 has a curvature Cv that curves gently toward both ends.

A wiper frame 200 according to the present invention may be applied to a wiper integrally formed with an elastic spring rail, from which an adaptor 90 is bent to connect to a wiper arm. That is, a frame 60 may be designed to support a rubber blade 100 against a windshield surface 70 while being coupled through an adapter 90 to a wiper arm 80 that moves the wiper across the windshield surface 70. Specifically, the wiper frame 60 is installed along the sliding insert 101 of the rubber blade 100, and is a spring rail having a predetermined elasticity for distributing the load on the rubber blade 100 evenly across the windshield surface 70. This may be applied to wiper structures with frames and blades that have built-on spoilers for reducing air resistance by being formed at a certain angle, in order to prevent lift of the wiper.

Second Embodiment

Referring to FIGS. 13 through 15, a rubber blade 100 of a wiper according to the second embodiment is mounted to a frame 200a with a certain elasticity that evenly distributes load along the rubber blade 100 onto the windshield surface 70. The frame 200a is coupled through an adapter 90 to a wiper arm 80 and presses the rubber blade 100 against the windshield surface 70 to simultaneously move the rubber blade across the windshield surface 70. The rubber blade has a sliding insert 101 into which the frame 200a is installed.

The top of the rubber blade 100 is slanted and installed at a predetermined angle at a mounting portion 102 with respect to the frame 200a, and the lower end of the rubber blade 100 has a wiping portion 104 that extends from the mounting portion 102 and includes a contact surface 103 contacting the windshield surface 70.

The mounting portion 102 and wiping portion 104 are formed so that their centers are offset from one another by a predetermined distance L1, so that the pressing force (fs) of the wiper arm 80 passes through the central point P4 of the wiping portion 104.

The offset distance L1 between the mounting portion 102 and the wiping portion 104 of the rubber blade 100 may be deemed the distance between the center P1 of the mounting portion 102 and the center P2 of the wiping portion 104.

The pressing force (fs) of the wiper arm 80 applied to the rubber blade 100 passes between the center P2 of the wiping portion 104 and the contact point P3 on the windshield surface 70 through the offset between the mounting portion 102 and the wiping portion 104.

The rubber blade 100 according to the present invention may be applied to a wiper that is a tensile member having an integrally formed frame and spring with an adapter bent therefrom. That is, the frame 200a is coupled through its adapter 90 to the wiper arm 80 that presses the rubber blade 100 against a windshield surface 70 and simultaneously moves the rubber blade across the windshield surface 70, where the rubber blade has a sliding insert 101 into which the spring rail (with a certain elasticity that evenly distributes load along the rubber blade 100 onto the windshield surface 70) is installed. This may be applied to wiper structures with frames and blades that have built-on spoilers for reducing air resistance by being formed at a certain angle, in order to prevent lift of the wiper.

The wiper frame and rubber blade according to the embodiments of the present invention have the following characteristics.

Figure 7A:
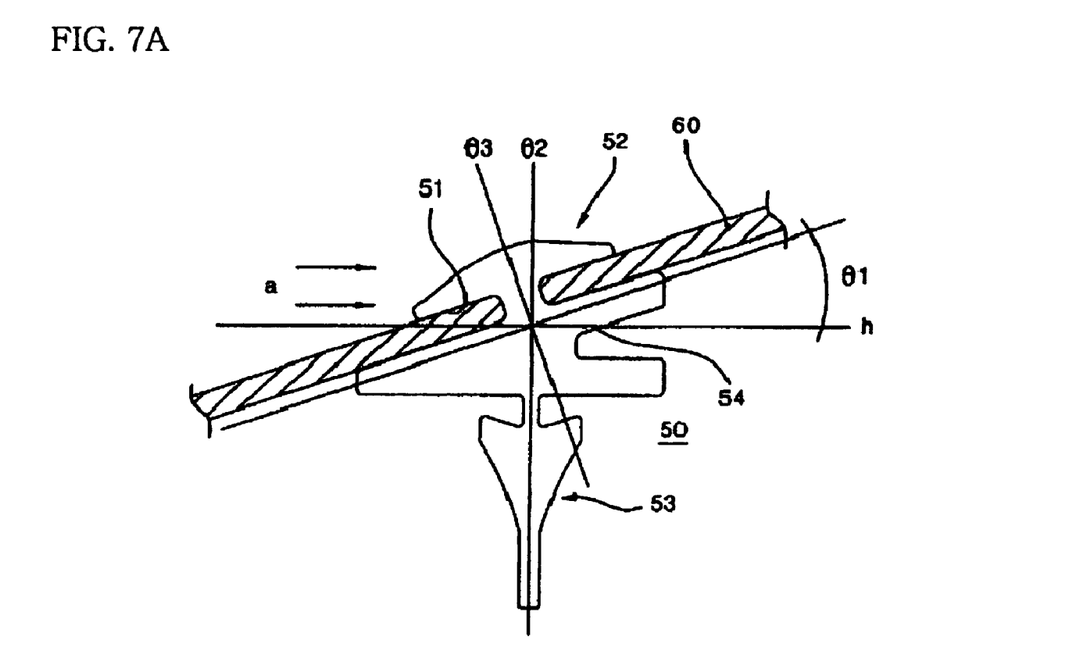
FIG. 7A is a sectional view of the structure of a rubber blade according to the present invention.
Figure 7B:
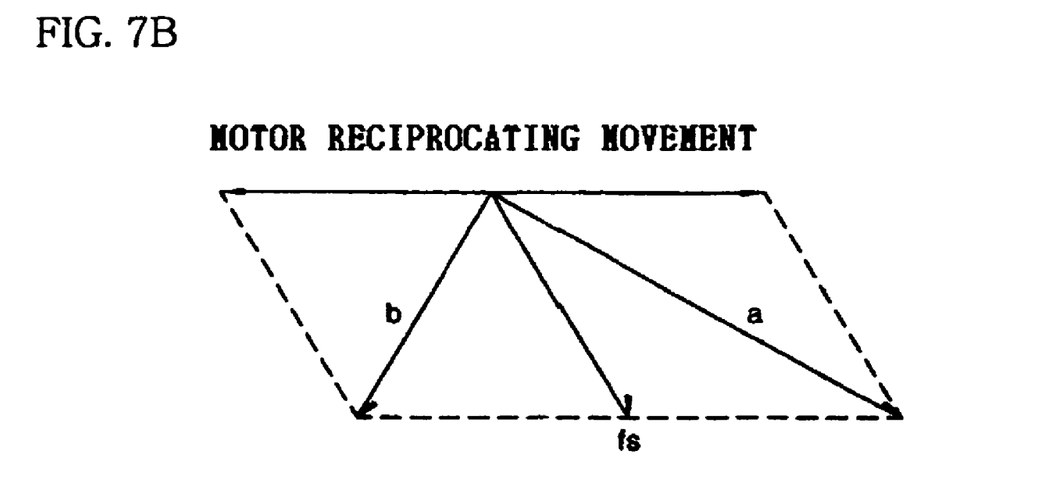
FIG. 7B shows the asymmetrical operation of the rubber blade in terms of pressure direction.

In order to prevent lift of the wiper, the wiper structure shown in FIG. 7A positions the frame 60 and the rubber blade 50 at an overall slant of θ1, so that they are disposed at an angle θ3 with respect to a vertical axis θ2. Here, the driving force of the motor remains constant, and when the pressing force (fs) of the wiper arm is transferred to the rubber blade 50, the point of the pressing force (fs) is applied asymmetrically in directions (a) and (b) (see FIG. 7B), so that the contacting end of the rubber blade is not maintained in a vertical disposition with respect to the windshield surface. That is, the blade does not evenly contact the windshield surface due to the asymmetrical pressing force in directions (a) and (b).

Figure 8A:
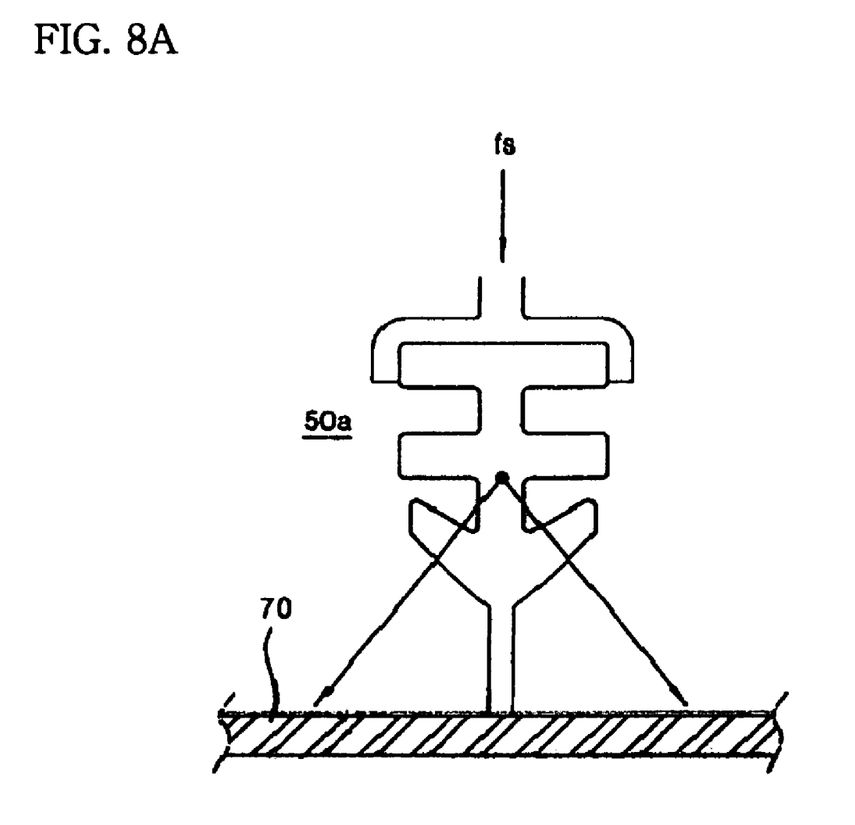
FIG. 8A is a sectional view showing the structure of a wiper blade according to the related art.
Figure 8B:
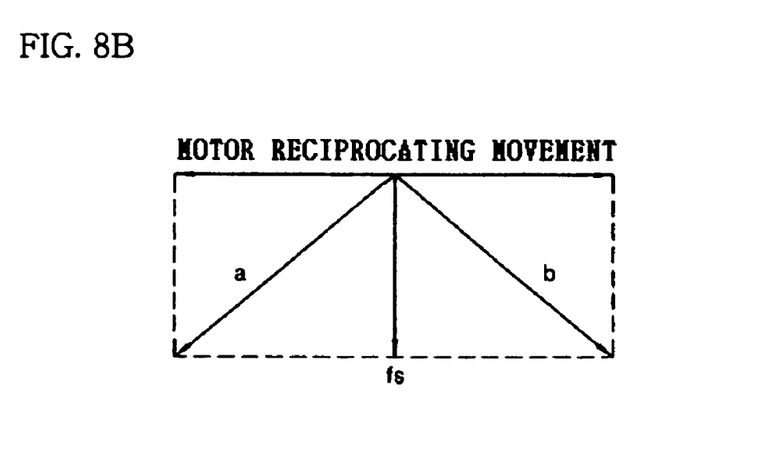
FIG. 8B shows the symmetrical operation of the rubber blade in terms of pressure direction.

Comparatively, FIG. 8A shows a rubber blade 50a according to the related art. This blade is not configured at an angle, so that the pressing force (fs) is symmetrically and evenly applied vertically on the windshield surface 70 in directions (a) and (b), and regardless of the rotation and position of the wiper, as shown in FIG. 8B.

The present invention changes the configuration of the frame and/or the rubber blade so that an ideal contact is maintained under all circumstances, which is shown in the first and second embodiments.

FIGS. 9 and 10 show a frame structure of a wiper according to the first embodiment of the present invention, which includes a spoiler function to prevent lift of the wiper, as illustrated in FIG. 7. FIG. 11 shows the even distribution of the initial applied pressure (fs1) and the latter applied pressure (fs2) from the wiper arm along sectors A through E along the wiper frame in FIG. 10, and FIG. 12 shows the slot configuration of a wiper frame according to the first embodiment of the present invention.

FIGS. 13 and 14 show the structure of a rubber blade according to the second embodiment of the present invention, with an air spoiler function for preventing lift of the wiper as that shown in FIG. 7. FIG. 15 shows the structure and shape of the rubber blade according to the second embodiment of the present invention.

First Embodiment

Referring to FIGS. 9 through 12, a rubber blade 100 installed to a frame 200 according to the present invention has a mounting portion 102 at its top that is disposed at a predetermined angle and installed to the frame 200. The bottom portion of the rubber blade 100 has a wiping portion 104 that extends from the mounting portion 102 and has a contact surface 103 that contacts the windshield surface 70.

Here, the centers of the mounting portion 102 and wiping portion 104 are offset by a distance L1 from each other, due to the position of the slot 201 of the frame 200. When the pressing force (fs) or (fs1-fs2) is applied by the wiper arm 80, it passes through the center P4 of the wiping portion 104. Thus, the slant of the slot 201 of the frame 200 and its shape take into consideration and are formed at the point of applied pressure of the wiper arm.

According to the shape and position of the slot 201 of the frame 200, an offset is formed between the mounting portion 102 and washing portion 104 of the rubber blade 100, with the offset L1 being the distance between the central point P1 of the mounting portion 102 and the central point P2 of the washing portion 104.

The pressing force (fs, or fs1-fs2) of the wiper arm 80 that is applied to the rubber blade 100 passes between the center point P2 of the wiping portion 104 and the contact point P3 that contacts the windshield surface 70, by means of the structural offset between the mounting portion 102 and the wiping portion 104.

The shape of the slot 201 formed in the frame 200 is formed symmetrically to either side of the center (fp) of the frame 200, as shown in FIG. 11, and the shape of the slot 201 formed in the frame 200 has a gradual curve (Cv) towards either end thereof.

That is, when pressure is equally distributed along sectors A through E from the center (fp) of the pressing force, the contact surface 103 of the wiping portion 104 of the rubber blade is resultantly offset from a vertical disposition on the windshield surface. However, when the shape of the slot 201 of the frame 200 is curved similarly, the angle of the contact surface of the wiping portion 104 receives elasticity and is disposed at an angle almost perpendicular to the glass.

Accordingly, when the mounting structure of the rubber blade in the frame is configured according to the present invention, in the case of an asymmetrical pivoting movement of the rubber blade contacting the windshield surface, a spoiler effect for preventing lift of the wiper at high speed can be achieved without using a separate spoiler. Therefore, the problem of not being able to maintain the angle of the rubber blade (which has vertical pressure applied thereon) at an angle vertical to the windshield surface can be easily overcome by using the offset maintained between the point of pressure exerted by the wiper arm and the center point of actual contact on the windshield surface as a center.

Second Embodiment

Referring to FIGS. 13 through 15, the upper portion of the rubber blade 100 has the mounting portion 102 that is disposed and installed at a predetermined angle with respect to the frame 200a, and the lower end of the rubber blade 100 includes a wiping portion 104 extending from the mounting portion 102 and having a contact surface 103 that contacts the windshield surface 70.

The mounting portion 102 and the wiping portion 104 are formed such that their respective centers are offset by a predetermined distance L1. When a pressing force (fs) is applied by the wiper arm 80, it passes through the center point P4 of the wiping portion 104. Accordingly, the angle and shape of the rubber blade is formed to be at the center of pressure applied by the wiper arm.

The offset distance L1 between the mounting portion 102 and wiping portion 104 of the rubber blade 100 is set as the distance between the center point P1 of the mounting portion 102 and the center point P2 of the wiping portion 104.

The pressing force (fs) of the wiper arm 80 on the rubber blade 100 is structurally configured to pass through the offset between the mounting portion 102 and the wiping portion 104 and through between the center point P2 of the wiping portion 104 and the contact point P3 contacting the windshield surface 70.

Accordingly, when the mounting structure of the rubber blade in the frame is configured according to the present invention, in the case of a wiper structure with an asymmetrical pivoting movement of the rubber blade contacting the windshield surface, a spoiler effect for preventing lift of the wiper at high speed can be achieved without using a separate spoiler. Therefore, the problem of not being able to maintain the angle of the pressure applied on the rubber blade at an angle vertical to the windshield surface can be easily overcome by using the offset maintained between the point of pressure exerted by the wiper arm and the center point of actual contact on the windshield surface as a center.

The wiper frame and rubber blade according to the present invention act as a spoiler for oncoming air, and maintain the contacting angle between the rubber blade and the windshield surface close to a perpendicular 90°, regardless of the pressure point exerted by the wiper arm and the motion provided by the motor, so that a close contact is maintained between the rubber blade and windshield surface for superb wiping ability.

It will be apparent to those skilled in the art that various modifications and variations can be made in the present invention. Thus, it is intended that the present invention covers the modifications and variations of this invention provided they come within the scope of the appended claims and their equivalents.

What is claimed is:

1. A rubber blade of a wiper mounted to a frame with a predetermined elasticity, wherein the frame is coupled through an adapter to a wiper arm and presses the rubber blade against a windshield surface with a pressing force to simultaneously move the rubber blade across the windshield surface, said rubber blade comprising:

- a head portion formed at an upper end of the rubber blade and including a pair of substantially uniform width mounting slots adapted to receive the frame therein, the mounting slots defining a first reduced width portion therebetween which acts as a sliding insert for distributing a load from the wiper arm evenly across the rubber blade, the mounting slots further defining a first transverse axis passing centrally therethrough, a second transverse axis extends perpendicular to said first transverse axis and passes substantially through a center of said first reduced width portion and through a central point of the head portion; and
- a wiping portion, forming a lower portion of the rubber blade, contacting the windshield at a tip end thereof and including a second reduced width portion coupled with the head portion; and
- the head portion and wiping portion together define a rubber blade profile, wherein a vertical axis passes substantially centrally through the reduced width portions, said central point of the head portion and said tip end, said second transverse axis extending at an offset angle with respect to the vertical axis and intersecting the vertical axis at a point between said mounting slots within said first reduced width portion, said first transverse axis being inclined toward the windshield surface;
- wherein an offset is defined between the second transverse axis and an axis which is substantially parallel thereto and passes through a central point of the wiping portion, and
- the rubber blade is held to retain the profile in a disposition of substantially 90 degrees with respect to the windshield surface.

2. The rubber blade according to claim 1, wherein the pressing force passes between a center of the wiping portion and a contact point defined between the tip end and the windshield surface and through the offset between the head portion and the wiping portion.

3. A wiper assembly comprising:

- a frame having a predetermined resilience and coupled through an adaptor to a wiper arm, the wiper frame supporting a rubber blade which is pressed on a windshield surface, wherein the rubber blade is movable by the wiper arm across the windshield surface, and the rubber blade includes:
- a head portion formed at an upper end of the rubber blade and including a pair of substantially uniform width mounting slots adapted to receive the wiper frame therein, the mounting slots defining a first reduced width portion therebetween which acts as a sliding insert for distributing a load from the wiper arm evenly across the rubber blade, the mounting slots further defining a first transverse axis passing centrally therethrough, a second transverse axis extends perpendicular to said first transverse axis and passes substantially through a center of said first reduced width portion and through a central point of the head portion; and
- a wiping portion, forming a lower portion of the rubber blade, contacting a windshield at a tip end thereof and including a second reduced width portion coupled with the head portion; and
- the head portion and wiping portion together define a rubber blade profile, wherein a vertical axis passes substantially centrally through the reduced width portions, said central point of the head portion and said tip end, said second transverse axis extending at an offset angle with respect to the vertical axis and intersecting the vertical axis at a point between said mounting slots within said first reduced width portion, said first transverse axis being inclined toward the windshield surface; and
- said wiper frame comprising a guiding slot for guiding the sliding insert on the rubber blade wherein the guiding slot is formed in a position such that pressure of the wiper arm falls at a center of the wiping portion, an offset is defined between the second transverse axis and an axis which is substantially parallel thereto and passes through a central point of the wiping portion; and
- the rubber blade being held to retain the profile in a disposition of substantially 90 degrees with respect to the windshield surface.

4. The wiper frame according to claim 3, wherein the guiding slot is formed in a symmetric shape about a center of the wiper frame.

5. The wiper frame according to claim 3, wherein the guiding slot is formed with a curvature that curves gently toward both ends thereof.

* * * * *